United States Patent

Morgan et al.

Patent Number: 6,085,149
Date of Patent: Jul. 4, 2000

[54] INTEGRATED INERTIAL/VMS NAVIGATION SOLUTION

[75] Inventors: Kenneth S. Morgan, St. Petersburg; Michael O. Vaujin, Pinellas Park, both of Fla.

[73] Assignee: Honeywell Inc., Minneapolis, Minn.

[21] Appl. No.: 09/384,764

[22] Filed: Aug. 27, 1999

[51] Int. Cl.[7] .................................................... B60G 17/01
[52] U.S. Cl. ........................ 701/220; 701/38; 280/5.507
[58] Field of Search ................................ 701/220, 217, 701/37, 38, 207; 280/5.5, 5.502, 5.506, 5.507; 702/150, 154

[56] References Cited

U.S. PATENT DOCUMENTS

| | | | |
|---|---|---|---|
| 4,908,767 | 3/1990 | Scholl et al. | 702/150 |
| 5,217,246 | 6/1993 | Williams et al. | 280/5.5 |

*Primary Examiner*—Tan Nguyen
*Assistant Examiner*—Dalena Tran
*Attorney, Agent, or Firm*—Albert K. Kau

[57] ABSTRACT

A system for determining accurate inertial navigation data of a vehicle while moving must compensate for the orientation differences between an upper body and a lower body of the vehicle. These orientation differences are used to increase the accuracy of the aided inertial navigation solution.

15 Claims, 14 Drawing Sheets

INTEGRATED INERTIAL/VMS NAVIGATION SOLUTION

BACKGROUND OF THE INVENTION

Present state of the art for odometer aided inertial systems models a vehicle suspension system as a rigid body. Odometer aided inertial systems create an integrated navigation solution. The integrated navigation solution contains data such as vehicle position, vehicle velocity and vehicle attitude. In addition to these primary system outputs, the odometer aided inertial system calibrates the odometer with an odometer error model. Because the inertial system is mounted on the vehicle body and the odometer measures motion of the chassis, the odometer aided inertial system attempts to estimate the orientation between the vehicle body and the vehicle chassis. The body of this vehicle is defined as the upper part of this vehicle containing the engine, occupants, ammunition, etc. The vehicle body rests upon the vehicle chassis which is defined as the under part of this vehicle consisting of the frame with axles and the wheels or tracks.

This inertial/odometer error model works well when the integrated solution can estimate the relative orientation of the vehicle body to the vehicle chassis with a 0.08 degree or better accuracy. The assumption of constant relative orientation does not work well when the vehicle body moves significantly relative to the vehicle chassis. In some vehicles, this motion can be as much as two degrees. Significant errors in the odometer calibration occur when changes in this orientation are not modeled correctly. These errors in odometer calibration degrade the primary system outputs. Both vertical velocity and vertical position (altitude) are degraded because of the odometer modeling errors. Therefore, it would be beneficial to have the primary system outputs be optimally accurate. Further, it would be beneficial if the odometer modeling errors could be minimized or eliminated.

SUMMARY OF THE INVENTION

A system for determining accurate inertial navigation data of a vehicle while moving must compensate for the orientation difference between an upper body (the vehicle body) and a lower body of the vehicle (the vehicle chassis). The orientation difference is used to provide corrections to the inertial navigation data for a more accurate inertial navigation data. The system is dynamic in that it can refine and optimize the inertial navigation solution by constantly measuring the misalignment between the upper body and lower body of the vehicle as it is moving over various types of terrain. In addition to determining accurate inertial navigation data, position change can be determined as well.

DETAILED DESCRIPTION OF THE PRESENT INVENTION

The present invention determines that the relationship between the vehicle body 2 and the vehicle chassis 4 is primarily a function of vehicle pitch. This function of vehicle pitch has a zero order component and a first order component. Inertial systems are mounted on the body 2 of the vehicle 1 due to operational considerations. The sway ($\Phi$) of a vehicle 1 is an angular reorientation of the vehicle body 2 to the vehicle chassis 4 and is directly proportional to vehicle pitch ($\psi$). The proportionality constant is K. Vehicle pitch is defined as the angular orientation between the X vehicle body axis and the horizontal plane. The Z vehicle body axis is down through the center of the vehicle 1. The Y vehicle body axis is perpendicular to the X and the Z axis and toward the right when facing along the positive X body axis. The X, Y and Z axes form a right handed orthogonal coordinate frame.

Figure 1:
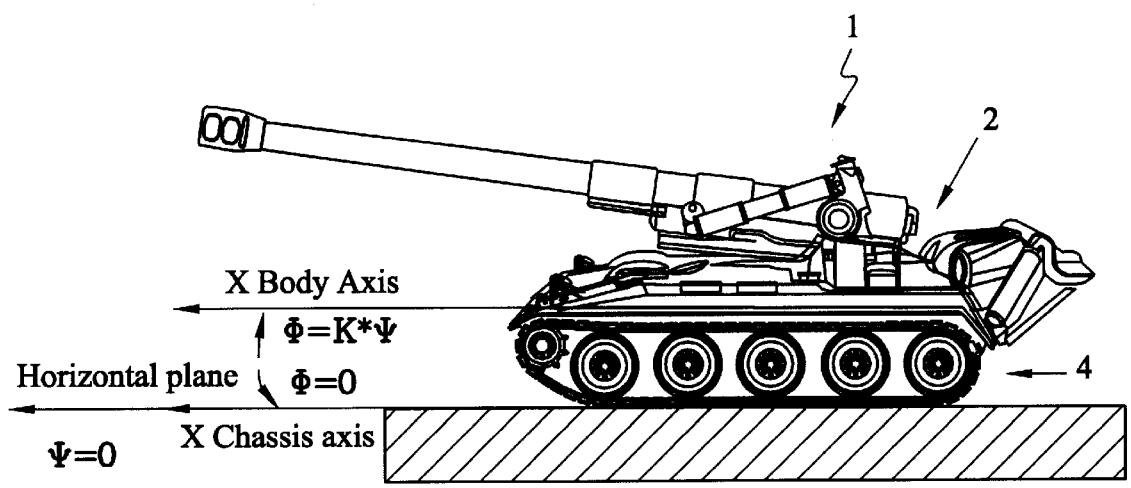
FIG. 1 shows a vehicle moving on a level terrain.
Figure 2:
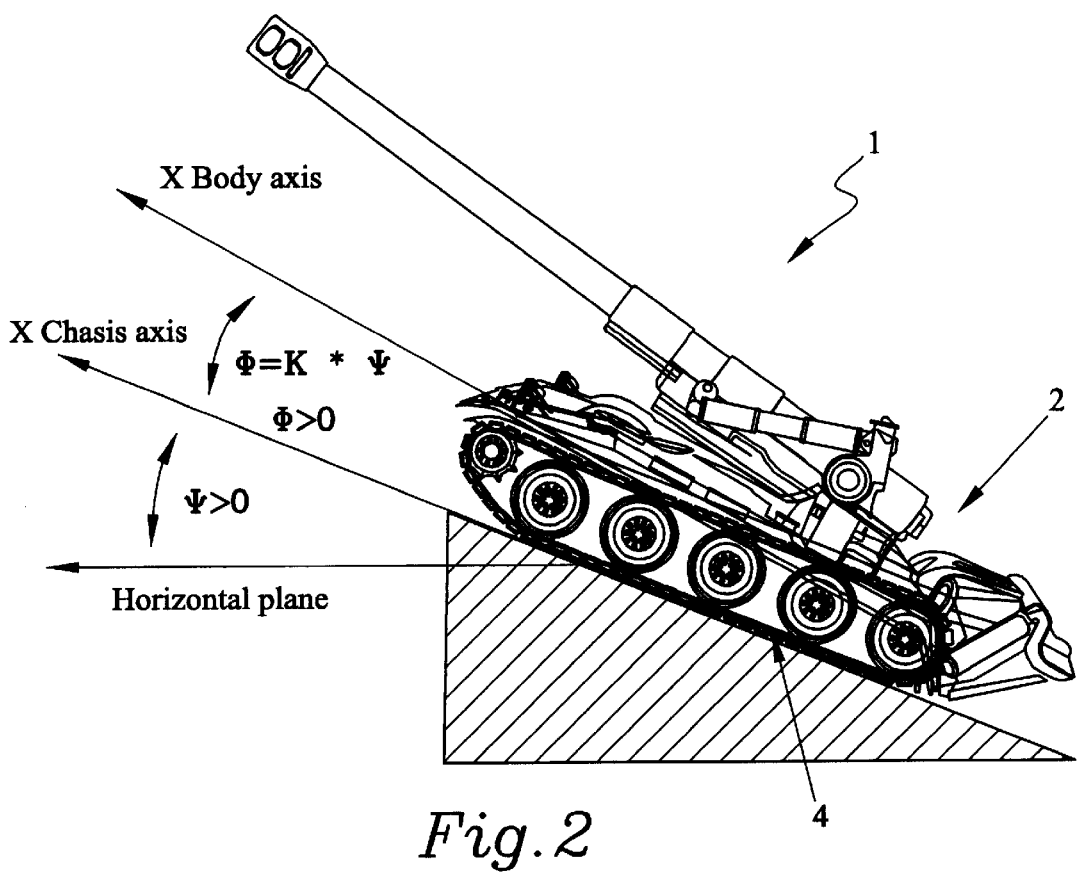
FIG. 2 shows a vehicle moving on an upward sloping terrain.
Figure 3:
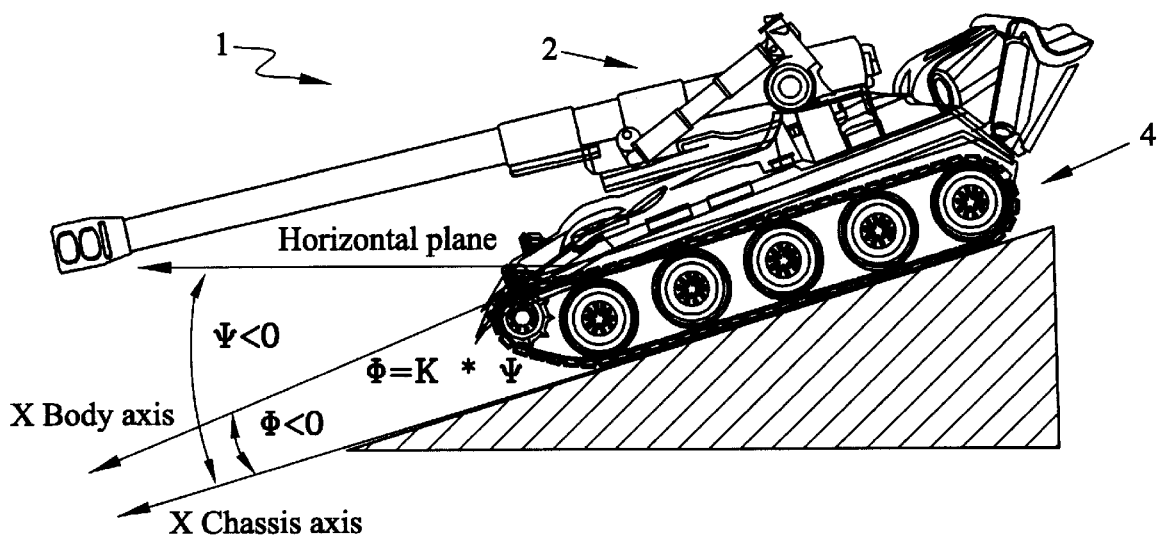
FIG. 3 shows a vehicle moving on a downward sloping terrain.

FIGS. 1–3 show a vehicle 1 traveling different terrain and the resulting vehicle body and vehicle chassis orientation. FIG. 1 shows a vehicle 1 on a level terrain and the pitch is zero. When the vehicle pitch is zero, then the vehicle sway is zero. The angular orientation between the vehicle chassis 4 and the vehicle body 2 remains constant. FIG. 2 shows a vehicle 1 driving upward such as a hill for example. The vehicle pitch is positive, and the vehicle sway is positive as a result. The angular orientation between the vehicle chassis 4 and the vehicle body 2 changes to a new value that is proportional to the vehicle pitch. The vehicle body 2 is lower on the tracks or wheels in the rear, and higher on the tracks or wheels in the front. FIG. 3 shows the vehicle 1 moving downward. The vehicle pitch is negative, and the vehicle sway is negative as a result. The angular orientation between the vehicle chassis 4 and the vehicle body 2 changes to a new value that is proportional to the vehicle pitch. The vehicle body 2 is higher on the tracks or wheels in the rear, and lower on the tracks or wheels in the front.

Figure 4:
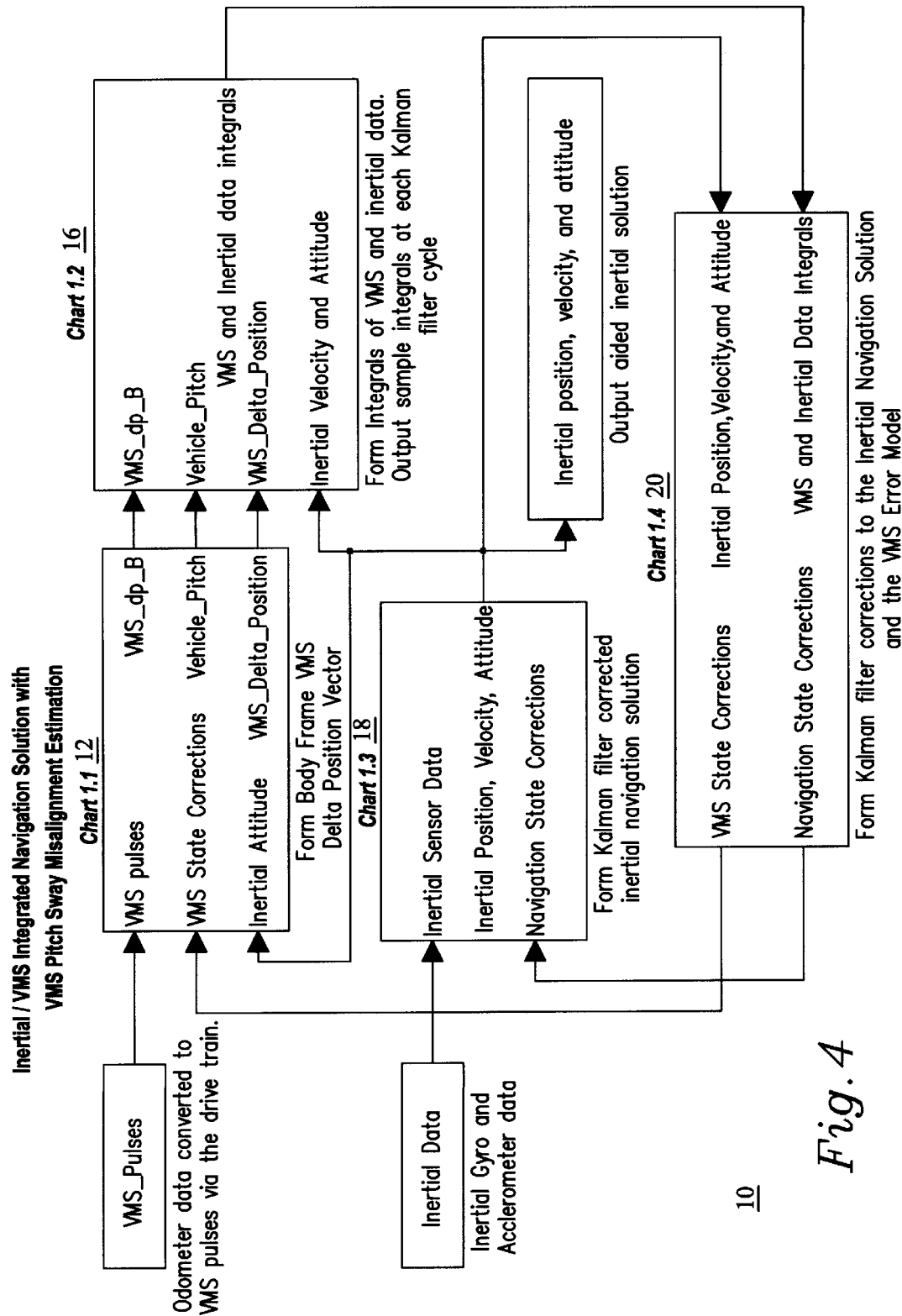
FIG. 4 shows the system of the present invention that determines increased accuracy inertial navigation data based on the sway.

FIG. 4 shows the general flow of data in an integrated inertial/VMS (Vehicle Motion Sensor) navigation system 10 of the present invention. The inputs to the system 10 are inertial data (gyro and accelerometer pulses) and VMS input pulses. Gyros and accelerometers (not shown) give measures of the inertial motion of the vehicle 1. Accelerometers are used to detect linear acceleration and gyros are used to measure angular motion. VMS pulses are discrete pulses from a vehicle motion sensor (not shown). A VMS typically involves an odometer cable with electronics used to convert the rotation of the odometer cable into pulse counts. A VMS will output fixed number of pulses for a given rotation of the odometer cable. The output of the system 10 is the optimally corrected inertial navigation solution. The inertial navigation solution consists of position, velocity, and attitude information for the vehicle 1.

Figure 5:
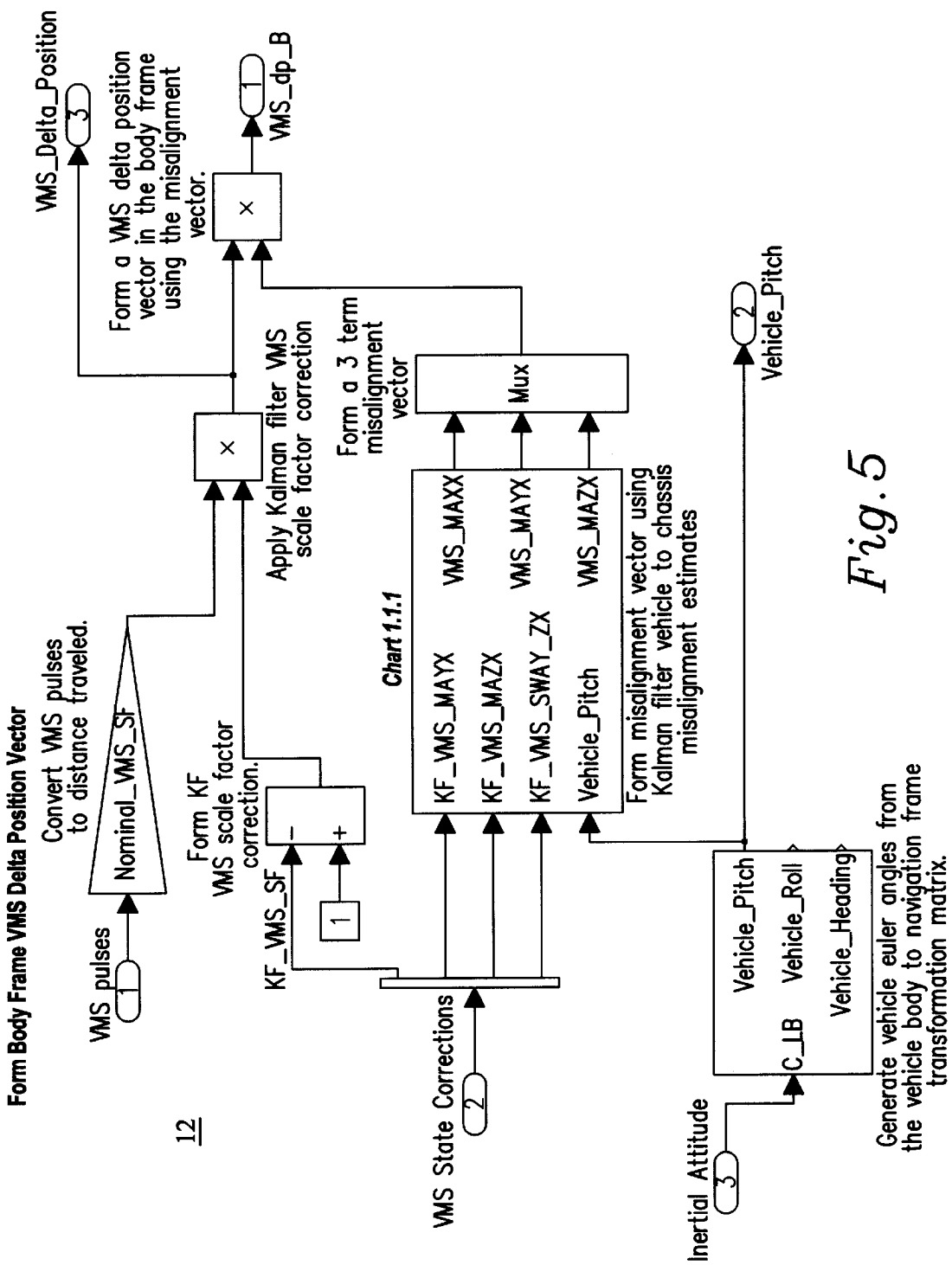
FIG. 5 shows the determination of the change in position of the vehicle in the body frame.

FIG. 5 shows a vehicle position change determining means 12 that uses the VMS, inertial, and Kalman filter data to form a vector representing vehicle position change in the vehicle body frame. The computations are performed at a higher rate than the computation rate of the Kalman filter. A typical rate for the Kalman filter would be one Hertz. The VMS delta position vector will be formed at a computation above 10 Hz and below 100 Hz. The VMS pulses are first converted to the distance traveled. The VMS pulses are multiplied by $\text{Nominal}_{13}$ VMS_SF or the VMS Scale Factor. The VMS Scale Factor is a constant representing the nominal number of pulses for a distance traveled. For example, the scale factor could be 1 foot for every 5 pulses.

VMS State Corrections from a previous processing cycle are input as KF_VMS_SF or the Kalman Filter VMS Scale Factor. The VMS pulses are combined with KF_VMS_SF to form a KF VMS scale factor correction to correct the current measured VMS distance traveled over a period of time to form a VMS position change or VMS_Delta_Position. This VMS position change is in the vehicle chassis frame. The VMS State Corrections are also input into a misalignment determination means 14 in which the Kalman Filter misalignment inputs are input as KF_VMS_MAYX, KF_VMS_MAZX, KF_VMS_SWAY_ZX. The Vehicle Pitch (Vehicle_Pitch) is also input in order to determine the VMS misalignment estimates expressed as VMS_MAXX, VMS_MAYX, VMS_MAZX which are combined in a Mux to form one vector which is then combined with corrected VMS delta position to form the VMS delta position in the body frame with the misalignment vector. This output is VMS_dp_B which is the distance traveled in the vehicle body frame. The Vehicle_Pitch is formed from the Inertial Attitude which also generates Vehicle_Roll and Vehicle_Heading with some standard calculations known in this area of technology.

Figure 6:
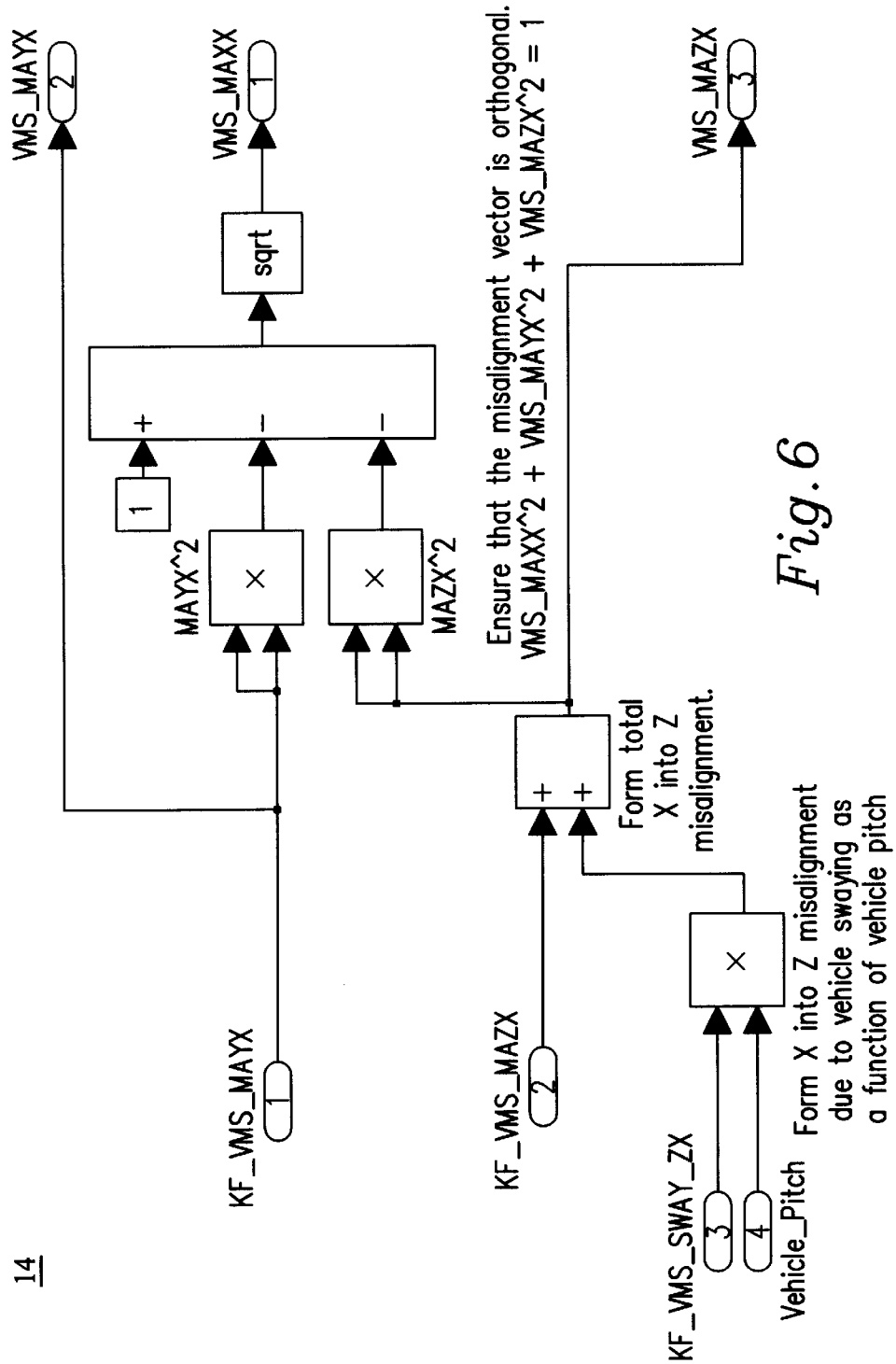
FIG. 6 shows a determination of misalignment between the body and the chassis in a vehicle.

FIG. 6 shows how Kalman filter estimates of the three VMS misalignment states are used to form a direction cosine vector used to transform VMS pulses from the vehicle chassis frame to the vehicle body frame. KF_VMS_MAYX is the misalignment between the chassis in the X axis and the body in the Y axis. KF_VMS_MAZX represents the misalignment between the chassis in the X axis and the body in the Z axis. These two misalignment factors will always exist as offsets since the chassis and body will never be perfectly aligned. VMS_MAYX is output without further processing since there is no significant misalignment change in the Y axis between the chassis 4 and the body 2 while the vehicle 1 is moving.

VMS_MAZX requires processing since sway between the body 2 and chassis 4 will occur while the vehicle 1 is moving. The pitch sway state symbol in FIG. 6 called KF_VMS_SWAY_ZX is the same as the K in FIG. 1, 2, and 3. This scale factor is a function of pitch and represents the misalignment changes that have occurred and is therefore combined with Vehicle_Pitch to result in a total misalignment. This total misalignment is combined with KF_VMS_MAZX to provide VMS_MAZX representing the new misalignment in the Z axis between the chassis 4 and body 2.

Using known calculations, MAZX and MAYX are used to determine VMS_MAXX. This is a direction cosine vector representing a new axis reference compensating for the misalignment between the chassis 4 and body 2. For example, assume the X, Y, Z axes are in the body frame. As stated before, the chassis 4 and body 2 have a misalignment. Therefore, to compensate for the misalignment and allow the chassis frame data to be used in the body frame, the X axis of the chassis frame will be at an angle from the X axis of the body frame. The cosine of this angle compensates for this misalignment between the chassis 4 and the body 2 and provides a new axis for which chassis data can be used in the body axes frame of reference.

Figure 7:
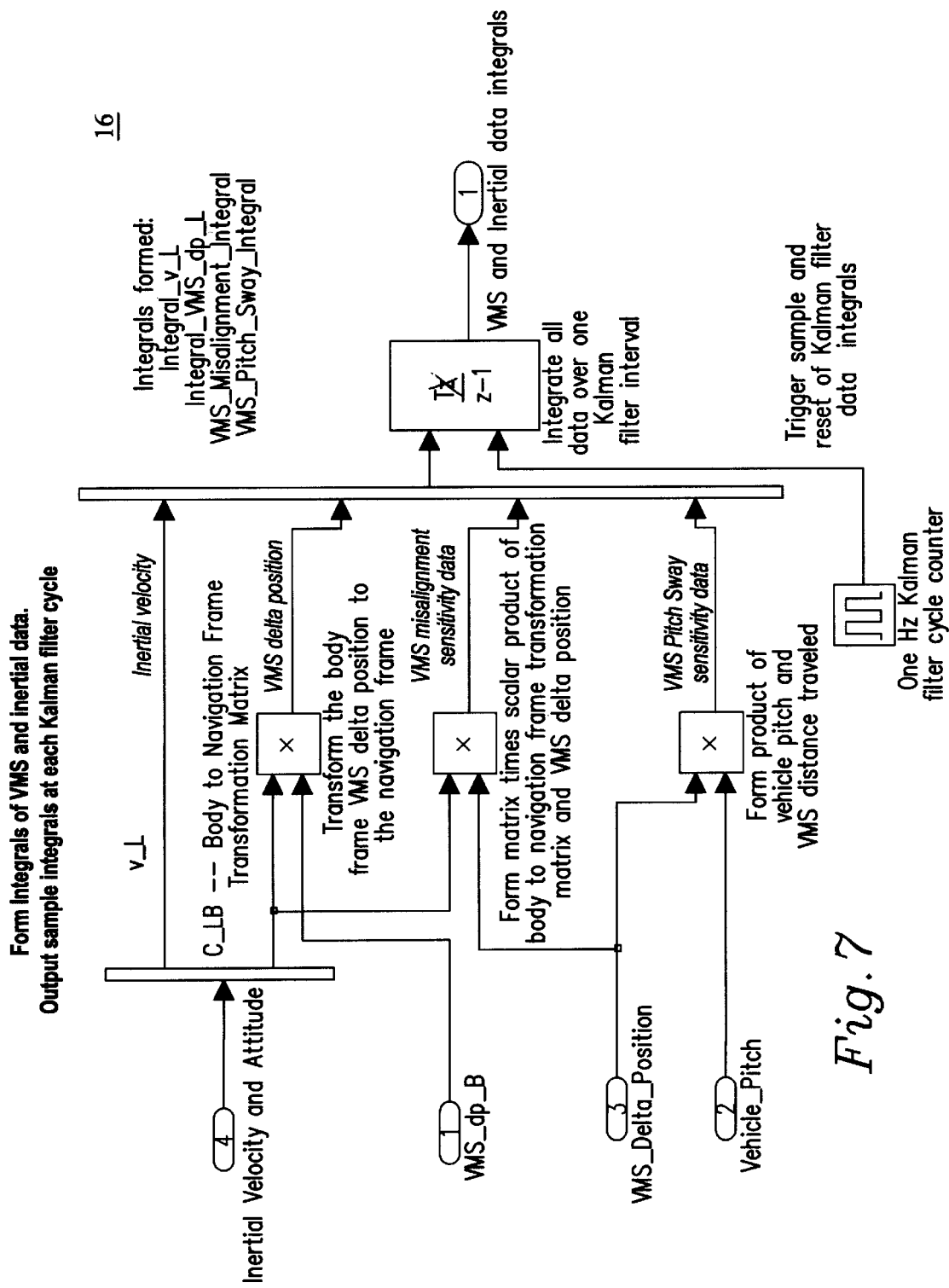
FIG. 7 shows the integration of velocity, position change, misalignments and sway.

FIG. 7 shows an integration means 16 that uses inertial and VMS data to form Kalman filter observations which combine the two different sources of position change information. FIG. 7 shows that the following items are integrated:

1) Inertial velocity is directly integrated to result in integrated inertial velocity in the navigation frame (Integral_v_L).

2) VMS delta position in the navigation frame (Integral_VMS_dp_L) is the integration result of C_LB combined with VMS_dp_B to transform the position change in the body frame to a navigation frame.

3) The product of the body to navigation frame transformation matrix (C_LB) and the VMS position change (VMS_Delta_Position) in the chassis creates the misalignment estimates. The integral is called VMS_Misalignment_Integral.

4) The product of the vehicle pitch angle and the VMS position change is combined to determine sway. This integral is called VMS_Pitch_Sway_Integral.

As stated before, all computations are performed at a higher computation rate than the computation rate of the Kalman filter and this applies to the integrals as well. A typical rate for the Kalman filter would be one Hertz. The VMS integration might occur at any rate from 10 Hz to 100 Hz.

Figure 8:
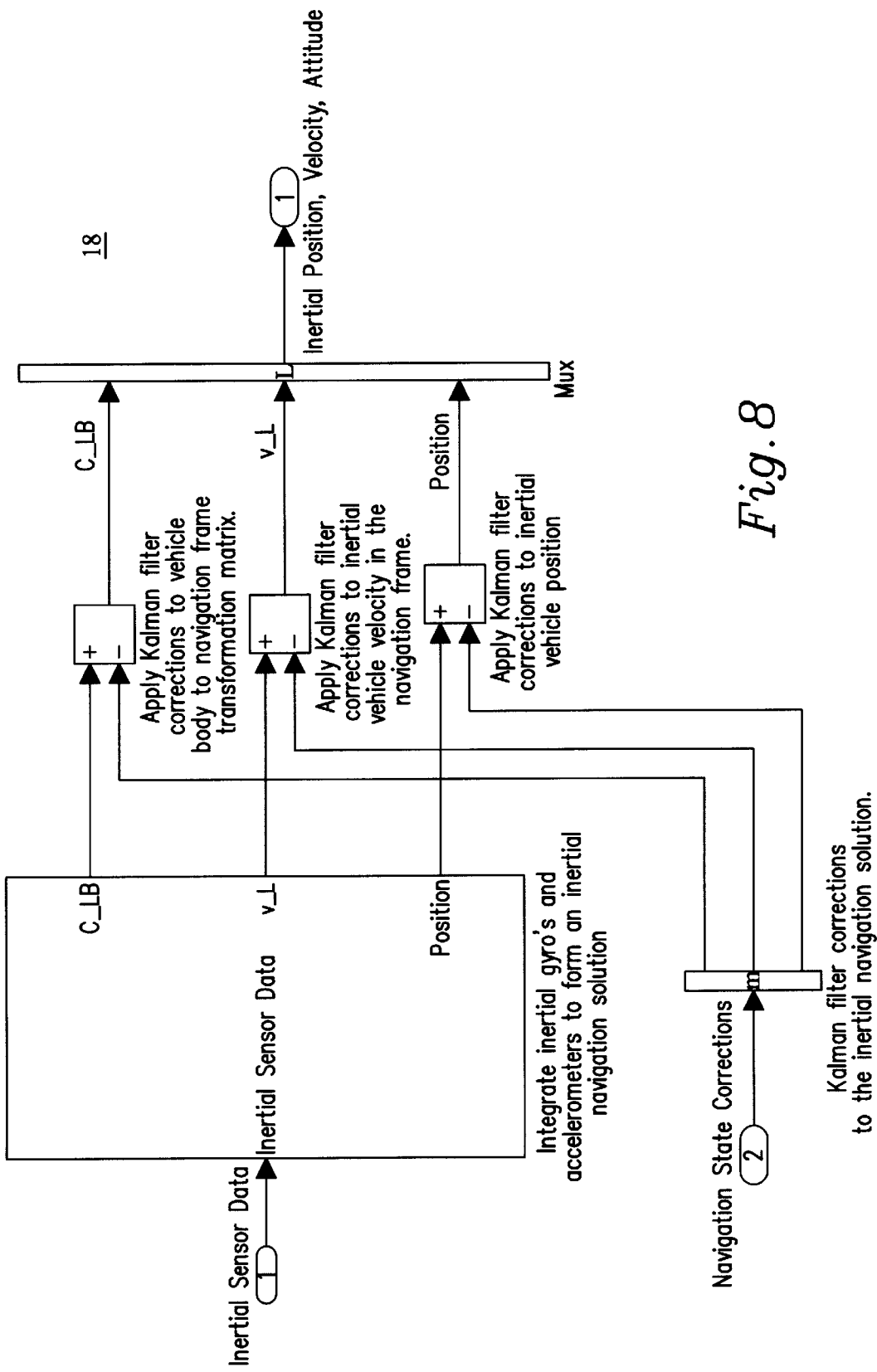
FIG. 8 shows correction of inertial navigation data.

FIG. 8 shows corrections means 18 that applies Kalman filter corrections to correct the inertial navigation solutions. These corrections are applied at the rate of the Kalman filter, typically one Hertz. A more complex model could include corrections for inertial sensor errors but that is not shown in this model. Firstly, the inertial sensor data from the gyro and the accelerometer are integrated to form an inertial navigation solution. This navigation solution is in the form of three outputs which are inertial vehicle velocity in the navigation frame, vehicle body to navigation frame transformation matrix, and inertial vehicle position. Kalman filter corrections are applied to these outputs to create a more accurate inertial position, velocity and attitude.

Figure 9:
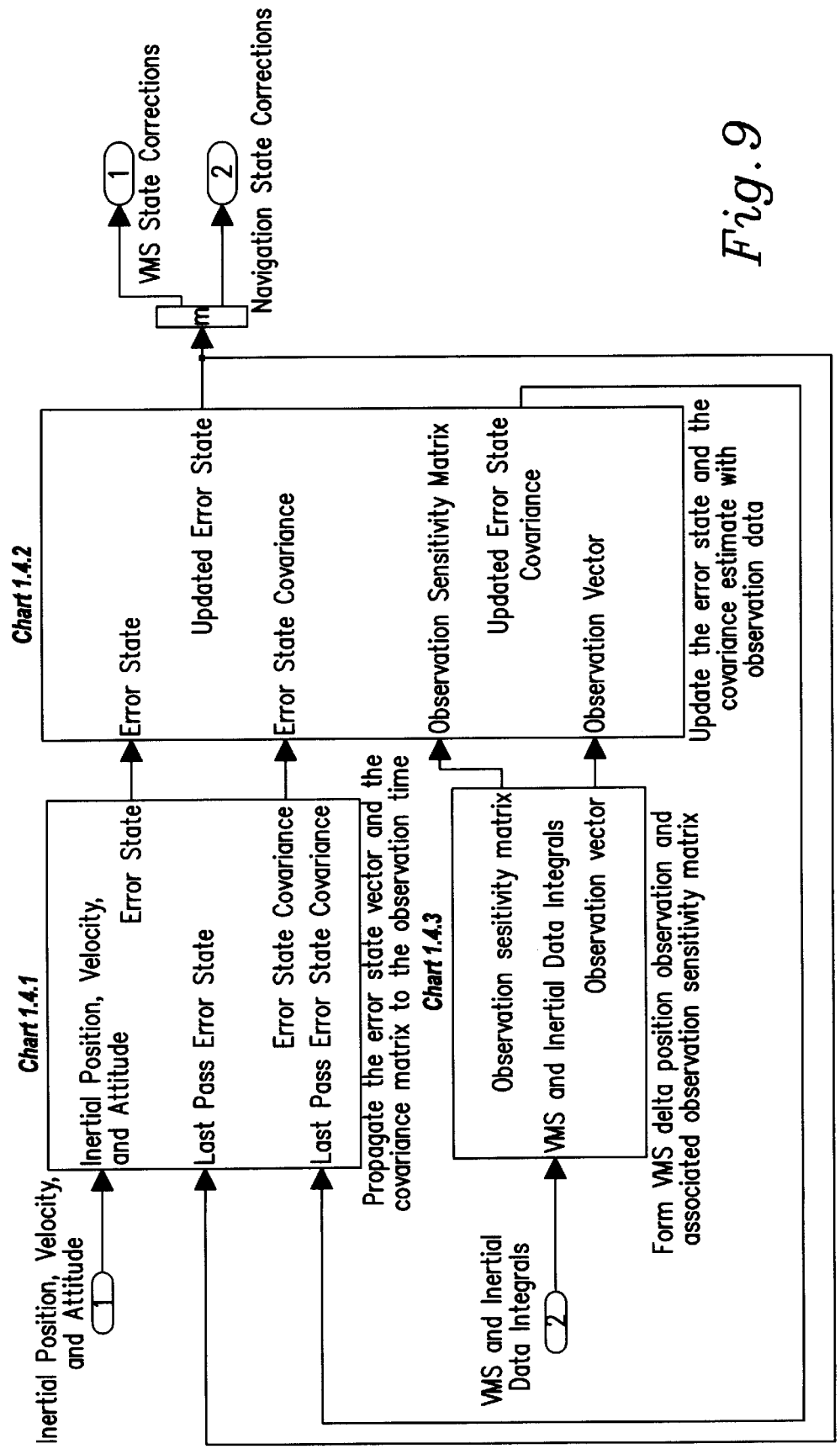
FIG. 9 shows the determination of corrections for the VMS as well as inertial navigation data.
Figure 10:
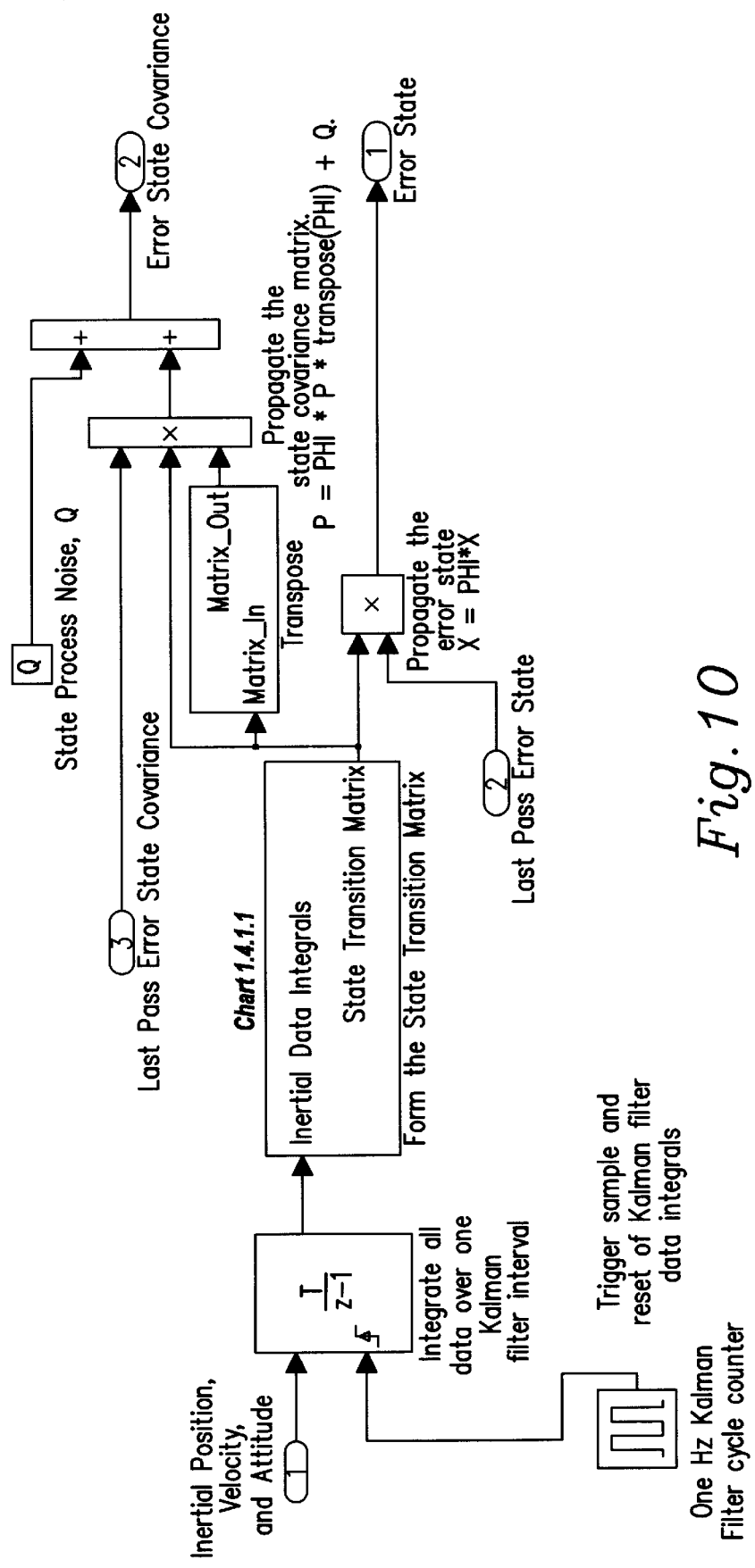
FIG. 10 shows the determination of errors and covariance matrix.
Figure 11:
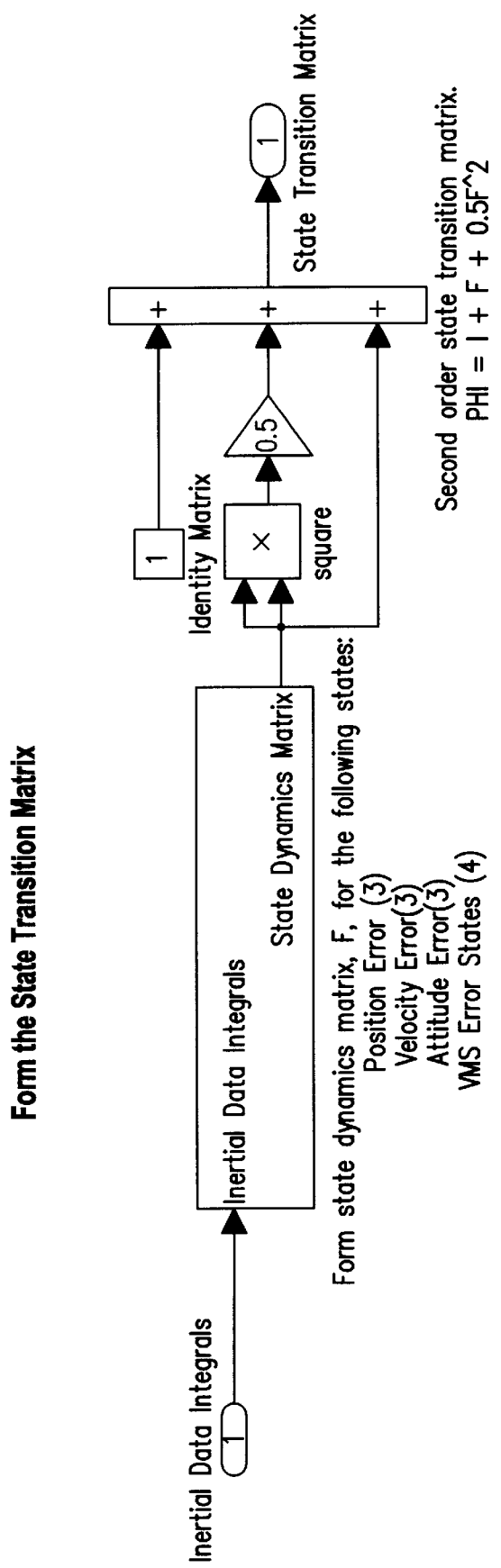
FIG. 11 shows the forming of the state transition matrix involved in determining the errors and covariance matrix.
Figure 12:
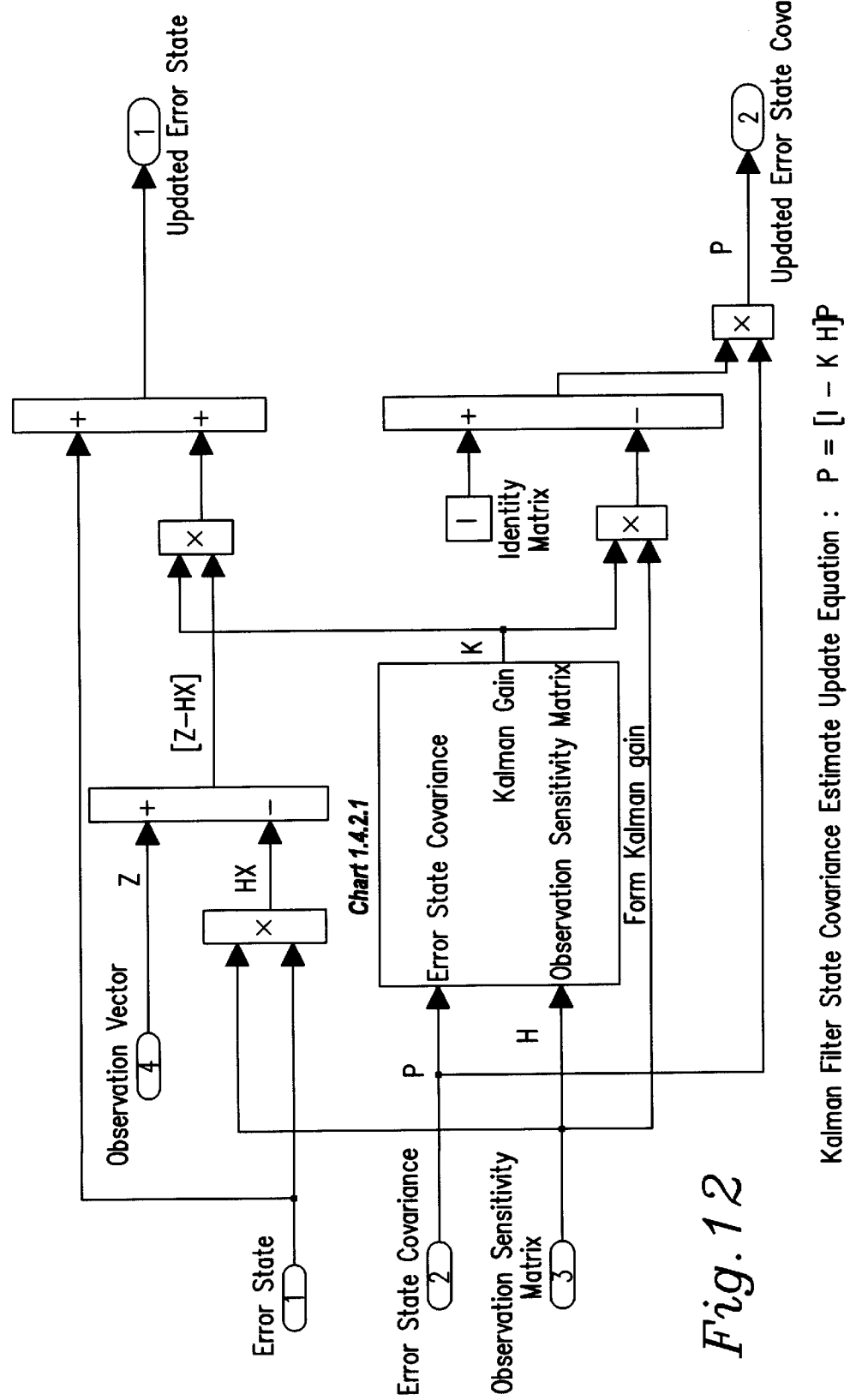
FIG. 12 shows the updating of the errors and covariance matrix.
Figure 13:
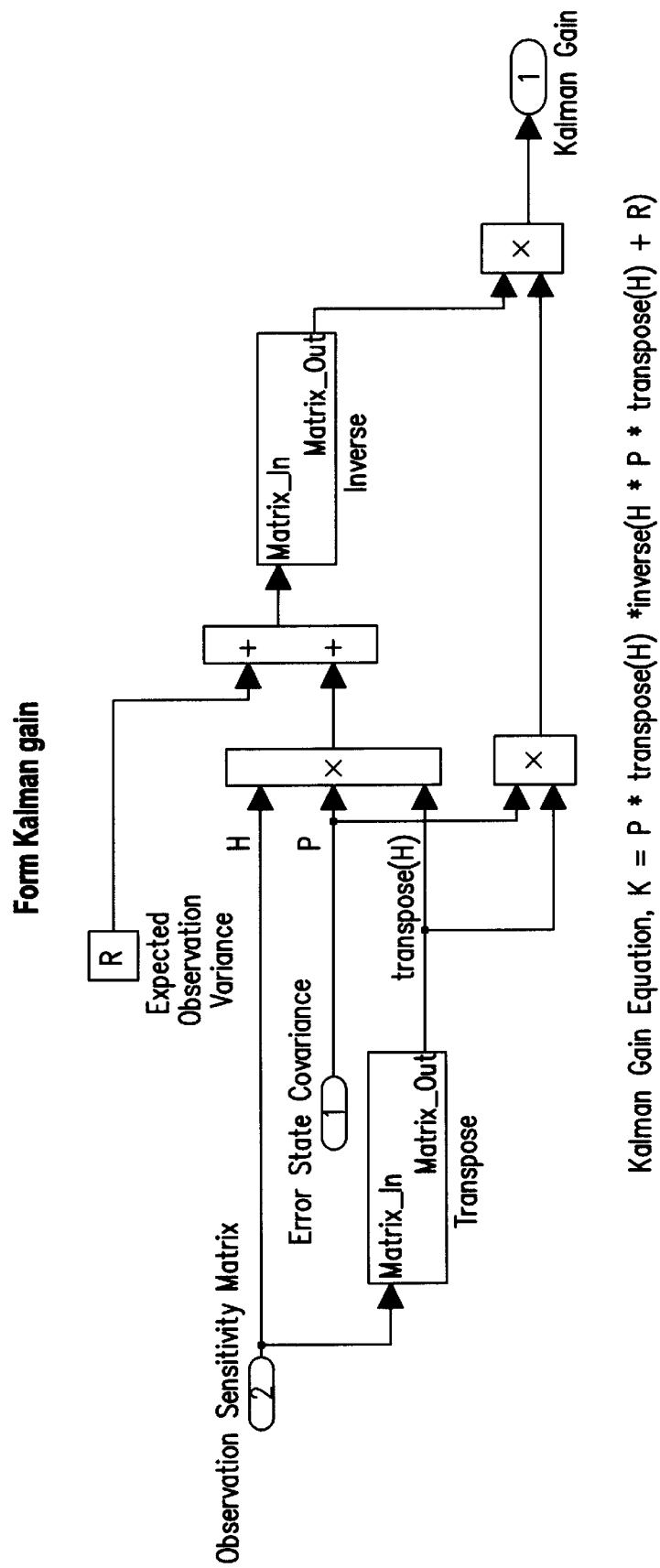
FIG. 13 shows the determination of the Kalman gain required in determining the updated errors as well as the updated covariance matrix.

FIG. 9 shows a means to develop corrections 20 for the VMS pulses as well as the inertial navigation data. The Kalman filter can be used to compare inertial and VMS data and determine errors in both sets of data. The inputs to this chart is the corrected inertial system data and the VMS and inertial data integrals. The outputs of this chart are the corrections to the inertial output and the VMS error states. FIG. 10 shows the equations used to update the covariance matrix and the error state estimate. FIG. 11 shows how the state transition matrix is formed using integrals of inertial information. FIG. 12 shows how the VMS delta position observation is used to update the estimate of inertial and VMS error states. FIG. 13 shows how the observation uncertainty data and the current estimate of the error state covariance are used to define the gain for the observations. The Kalman filter propagation and gain equations shown in these charts are based on the equations described in the book "Applied Optimal Estimation" written by the Technical Staff, the Analytic Sciences Corporation, edited by Arthur Gelb, 1974. This book is cited for example purposes only, but other equations may be used to arrive at the results of the present invention such that the presented invention is not limited to these equations.

Figure 14:
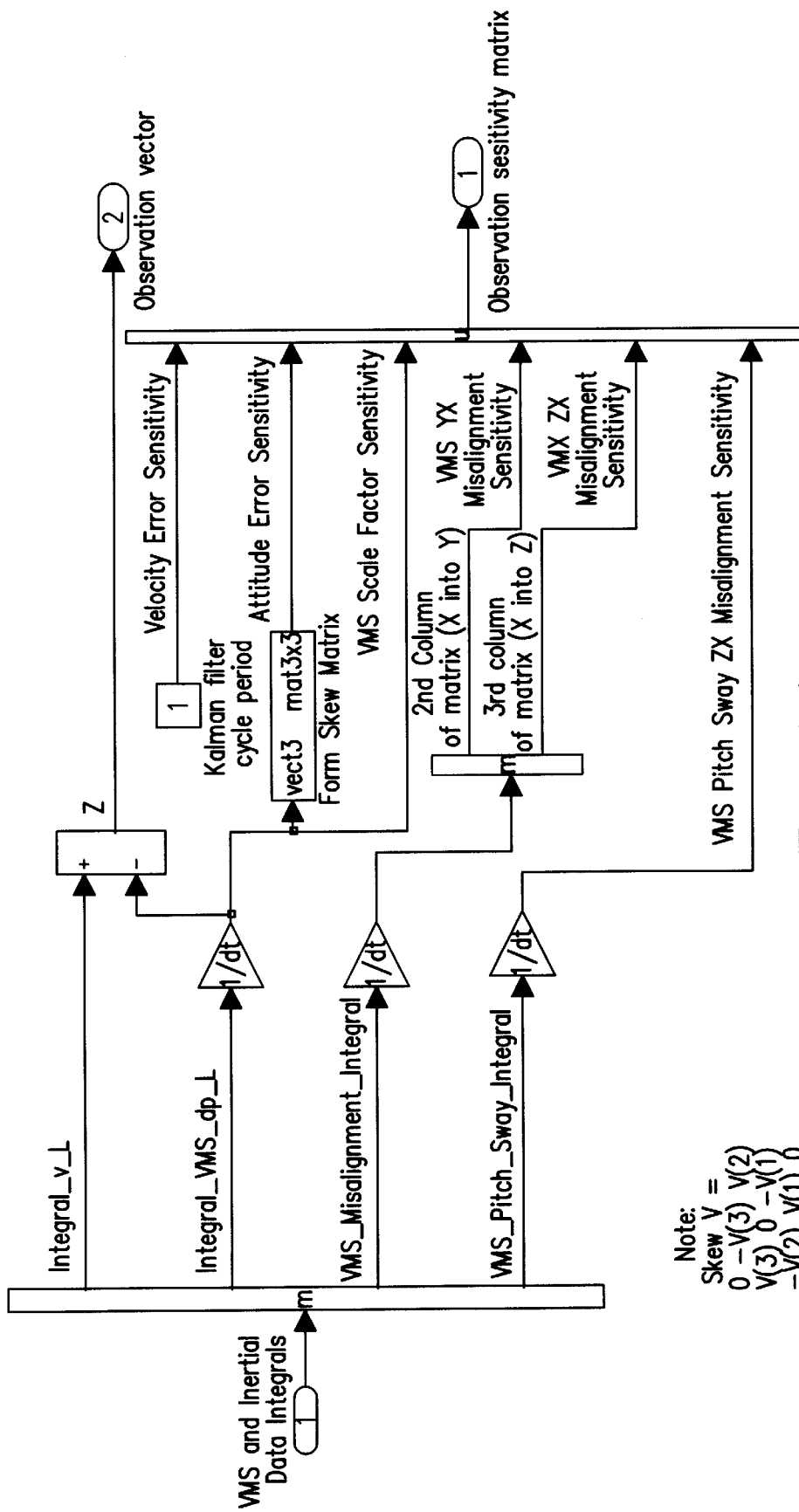
FIG. 14 shows partial determination of the correction factors for inertial navigation data as well as VMS based on integrated data that resulted from FIG. 7.

FIG. 14 shows the VMS delta position observation and the sensitivity of the observation to the VMS error states. Firstly, the integrals are scaled so that the data is no longer in relation to time. The Observation Vector is an updated position of distance traveled. The Observation Matrix has all the error sensitivities. Velocity and attitude are corrected based on known calculations. The VMS Misalignment Sensitivities are updating the misalignments in sway and between the axes. The VMS Scale Factor provides the scaling for determining the distance traveled. With the corrected misalignment outputs, the vehicle has the capability to obtain accurate determinations of inertial navigation data in a dynamic mobile environment.

The invention has been described herein in detail in order to comply with the Patent Statutes and to provide those skilled in the art with the information needed to apply the novel principles and to construct and use such specialized processes and components as are required. However, it is to be understood that the invention can be carried out by specifically different processes and components, and that various modifications, both as to the processing details and operating procedures, can be accomplished without departing from the scope of the invention itself.

What is claimed is:

1. A system for accurately measuring inertial navigation data of a vehicle, having an upper body and a lower body, comprising:

motion sensor determining changing orientation data of the upper body and the lower body as the vehicle is moving;

inertial sensors providing inertial sensor data; and apparatus determining orientation difference between the upper body and lower body and processing inertial sensor data based on the orientation difference to provide accurate inertial navigation data.

2. The system of claim 1 wherein the inertial navigation data is position, velocity and attitude.

3. The system of claim 1 wherein the orientation data is related to the vehicle's orientation with a horizontal axis.

4. The system of claim 1 wherein the motion sensor is an odometer.

5. The system of claim 1 wherein the inertial sensors are gyros and accelerometers.

6. A system for determining accurate inertial navigation data of a vehicle, having an upper body and a lower body, comprising:

motion sensor determining orientation data of the upper body and the lower body as the vehicle is moving;

inertial sensors providing inertial sensor data;

apparatus determining the inertial navigation data of the vehicle based on the inertial sensor data;

apparatus determining the difference in orientation between the upper body and the lower body;

apparatus integrating the inertial sensor data with the orientation difference to create integrated data; and apparatus for providing corrections to the inertial navigation data and the orientation data based on the integrated data for a more accurate inertial navigation data.

7. The system of claim 6 wherein the inertial sensor data is acceleration and angular motion.

8. The system of claim 6 wherein the orientation data is related to the vehicle's orientation with a horizontal axis.

9. The system of claim 6 wherein the motion sensor is an odometer.

10. The system of claim 6 wherein the inertial sensors are gyros and accelerometers.

11. The system of claim 6 wherein the system, further comprises:

means for determining position based on position change of the vehicle from a previously known position.

12. The system of claim 11 wherein the position change is integrated with the inertial sensor data and orientation difference to become part of the integrated data.

13. The system of claim 12 wherein the apparatus for providing corrections corrects position based on the integrated data.

14. The system of claim 6 wherein the orientation difference exists in the Z axis.

15. A method of providing accurate inertial navigation data in a vehicle, having and upper body and a lower body, comprising the steps of:

determining an orientation difference between the upper body and the lower body while the vehicle is moving;

integrating the orientation difference with inertial sensor data received from inertial sensors to create integrated data;

determining inertial navigation data from the inertial sensor data;

correcting the inertial navigation data with the integrated data to provide accurate inertial navigation data.

* * * * *